United States Patent [19]
Llort et al.

[11] Patent Number: 5,833,911
[45] Date of Patent: Nov. 10, 1998

[54] METHOD FOR FORMING A GLOVE USING A FOLDED GLOVE FORM

[75] Inventors: Francisco Moises Llort; Mao-Ching Chen, both of Arlington; Leslie Edward Blackford, Venus, all of Tex.

[73] Assignee: Johnson & Johnson Medical, Inc., Arlington, Tex.

[21] Appl. No.: 777,011

[22] Filed: Jan. 7, 1997

Related U.S. Application Data

[63] Continuation of Ser. No. 455,433, May 31, 1995, abandoned.

[51] Int. Cl.⁶ .............................. B28B 1/38; B29C 41/14; B22C 9/22; A41D 13/08
[52] U.S. Cl. ........................ 264/301; 264/303; 264/304; 264/305; 264/306; 264/307; 425/275; 2/159; 2/161.7; 2/167; 2/168
[58] Field of Search .................... 264/301, 303, 264/304, 305, 306, 307; 2/159, 161.7, 167, 168; 425/275

[56] References Cited

U.S. PATENT DOCUMENTS

| 363,829 | 5/1887 | Jennings | 2/159 |
| 1,294,105 | 2/1919 | Holden | 2/168 |
| 1,387,728 | 8/1921 | Kramer | 2/168 |
| 1,751,872 | 3/1930 | Medaugh | 2/159 |
| 1,762,865 | 6/1930 | Heinrich | 2/168 |
| 1,951,402 | 3/1934 | Gammeter | 18/41 |
| 2,117,417 | 5/1938 | Hall et al. | 2/168 |
| 2,373,940 | 4/1945 | Beall | 2/168 |
| 3,268,647 | 8/1966 | Hayes et al. | 264/303 |
| 4,016,027 | 4/1977 | Kintanar | 2/159 |
| 4,340,348 | 7/1982 | Kurtz | 425/270 |
| 4,390,492 | 6/1983 | Kurtz | 264/255 |

FOREIGN PATENT DOCUMENTS 1136587  12/1956  France.

Primary Examiner—Jan H. Silbaugh
Assistant Examiner—Robin S. Gray
Attorney, Agent, or Firm—Andrew C. Farmer

[57] ABSTRACT

A method for forming a glove in an elastomer deposition process employs a folded glove form. The form has a hand forming portion having palm and finger forming portions. The finger forming portions terminate in distal tips and the cuff forming portion terminates in a terminal end for forming the cuff opening. The form is folded so that finger forming portion distal tips and the cuff forming portion terminal end lie in separate planes and in facing relationship to one another. To form the glove, the form is vertically oriented and dipped into a bath of elastomer with both the cuff forming portion terminal end and the finger portion distal tips facing upwards.

15 Claims, 5 Drawing Sheets

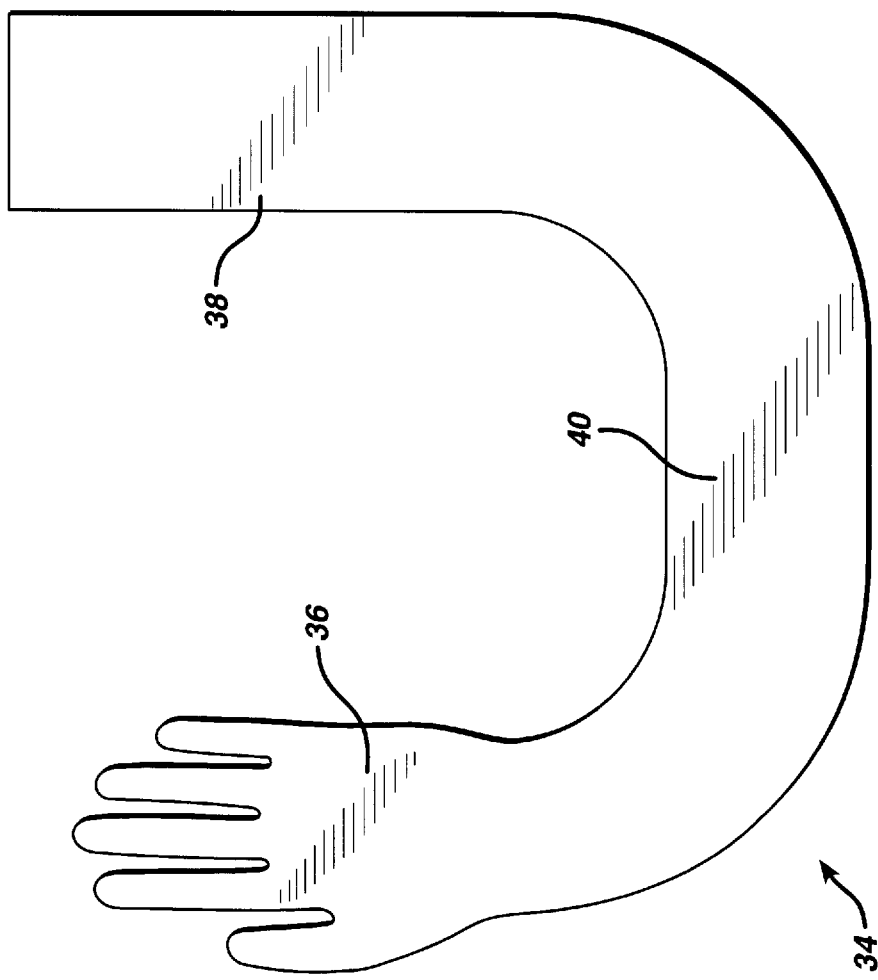

METHOD FOR FORMING A GLOVE USING A FOLDED GLOVE FORM

BACKGROUND OF THE INVENTION

This is a continuation of application Ser. No. 08/455,433, filed May 31, 1995, now abandoned.

FIELD OF THE INVENTION

The invention relates to a unique method for producing a glove and to a glove form for practicing the method.

BACKGROUND INFORMATION

Historically, medical and other types of elastomeric gloves have been made by a process which involves dipping a porcelain or aluminum glove form fashioned to resemble, to a large degree, the human hand into a solution of latex coagulant (usually a solution of calcium nitrite in alcohol), drying the latex coagulant and then immersing the form into a latex rubber compound.

Such forms are dipped into the coagulant and latex rubber baths finger first. Thus, the tips of the fingers are the first to enter the latex compound and the last to come out of the latex compound. This promotes a thicker film of latex at the fingertips, a situation which is not necessarily desirable.

Often, wearer's desire gloves with thin latex in the fingertips for maximum tactile sensation and thick latex in the cuff area for maximum strength. For instance, the Chen U.S. Pat. No. 5,370,900 issued Dec. 6, 1994 and incorporated herein by reference, discloses a process for making medical gloves whose fingers have thinner walls than the rest of the gloves. In this process, a first elastomeric layer is deposited onto the glove form, the fingertips are then leached of metal ions and the form is overcoated with a second elastomeric layer which primarily thickens the non-leached portion of the glove.

After dipping, glove forms are typically rotated so that any latex which has not gelled does not pool in the fingertip portion of the glove, further reducing sensitivity in this area. Of course, the step of inverting the glove form after dipping adds a further complexity to the process. The production of such gloves is a highly competitive endeavor in which small increases in efficiency become increasingly important.

For instance, many gloves are currently formed with flat glove form as opposed to a full three dimensional representation of the human hand. The Stockum U.S. Pat. No. 4,135,867 issued Jan. 23, 1979 and incorporated herein by reference discloses one such method for producing flat form gloves. Using a flat glove form allows more forms to be dipped simultaneously into a given size bath of latex as well as providing several additional advantages.

Most gloves for medical use have a limited cuff length which extends over a wearer's wrist and then terminates. However, some uses require gloves having substantially longer cuffs. For instance, veterinary gloves typically extend up to the wearer's elbow or beyond. Dipping such lengthy gloves adds further complexity to the previously described problems. For instance, the increased length of the glove enhances the thickness of the film of latex in the finger sections and at the very tip of the fingers. Additionally, rotating such a lengthy glove form through a 180° arc to invert the form after dipping requires additional space in the dipping area.

SUMMARY OF THE INVENTION

The present invention overcomes these and other limitations in the prior art by providing a folded glove form wherein the fingertip portion of the glove form is inverted with respect to the cuff portion.

A form according to the present invention is adapted for forming a glove in an elastomer deposition process. The form comprises a palm forming portion and finger forming portions adjacent to the palm forming portion and which terminate in distal tips away from the palm forming portion. A cuff forming portion is oriented adjacent to the palm forming portion and has an upper extent. The form is folded so that when the form is oriented with the cuff forming portion upper extent facing upwards, the finger portion distal tips face upwards. Thus, the form may be dipped into and removed from an elastomer bath with the finger forming portions oriented upwards and excess elastomer will drain away from the finger forming portion distal tips without requiring that the form be rotated after dipping.

The finger forming, palm forming and cuff forming portions are preferably of essentially uniform thickness. Shallow recesses can be formed in opposing lateral faces of the form and which cover most of the finger forming and palm forming portions of the form. Preferably, the finger forming and palm forming portions form a planar hand forming portion which is oriented in parallel facing relationship to the cuff forming portion.

A method for forming a glove according to the present invention comprises the step of providing a glove form comprising a palm forming portion, a cuff forming portion adjacent to the palm forming portion, the cuff forming portion having an upper extent, and finger forming portions adjacent to the palm forming portion, the finger forming portions terminating in distal tips away from the palm forming portion. The method further comprises orienting the form so that the cuff forming portion upper extent and finger portion distal tips face upwards, dipping the form into a bath of elastomer, removing the form from the bath, and draining excess elastomer from the form with the cuff forming portion upper extent and finger portion distal tips facing upwards. Thus, formation of drips of excess elastomer at the finger forming portion distal tips is inhibited without having to rotate the form.

The method can further comprise the step of draining the excess elastomer from a low portion of the form located along the form between the cuff forming portion upper extent and the finger forming portion distal tips and oriented beneath the cuff forming portion upper extent and the finger forming portion distal tips. Preferably, the low portion is located between the palm forming portion and the cuff forming portion, and the form is shaped and oriented so that the low portion comprises a point. Also, the cuff forming portion may be provided with an extended length which exceeds the combined lengths of the palm and finger forming portions.

BRIEF DESCRIPTION OF THE DRAWINGS

FIG. 5 is a front elevation view of a second embodiment of a glove form according to the present invention;

FIG. 6 is a side elevation view of the glove form of FIG. 5;

DETAILED DESCRIPTION

Figure 1:
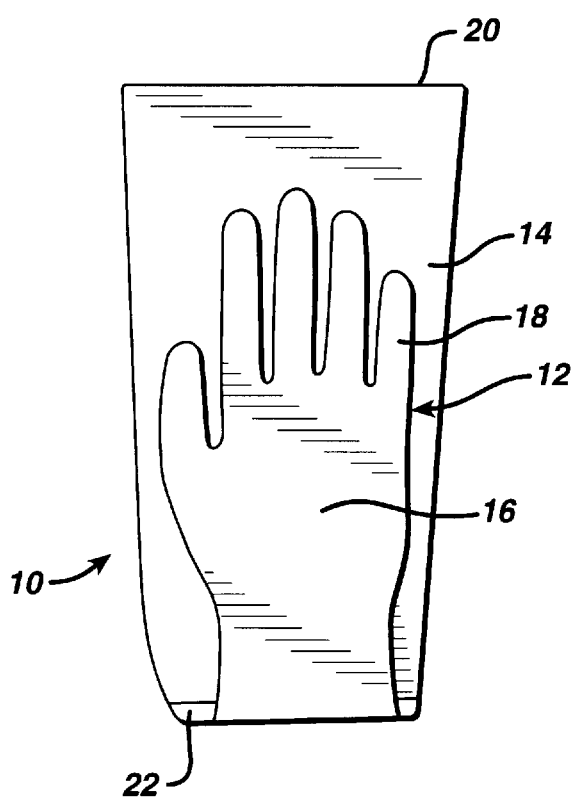
FIG. 1 is a front elevation view of a glove form according to the present invention.
Figure 2:
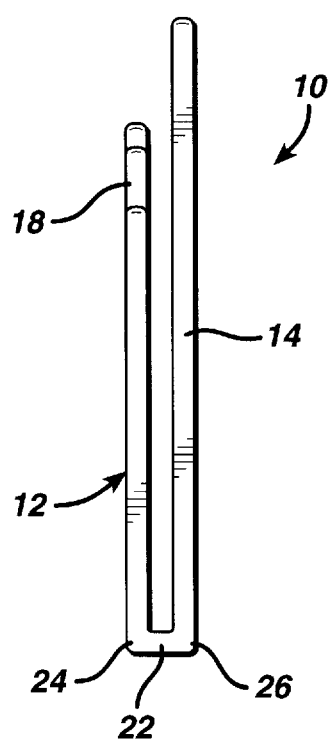
FIG. 2 is a side elevation view of the glove form of FIG. 1.

Turning to the drawings, and to FIGS. 1 and 2 and in particular,. a glove form 10 according to the present invention comprises a hand forming portion 12 and a cuff forming portion 14. The hand forming portion 12 further comprises a palm forming 16 and finger forming portions 18. A mounting bracket (not shown) or other similar support member may be affixed to an upper edge 20 of the cuff forming portion for attaching the form 10 to glove making equipment. For purposes of convenience, the additional glove making equipment has not been illustrated as it is well known in the art and the unique glove form 10 has applicability with virtually all types of equipment used in the dipping and other elastomeric deposition of gloves of the general type contemplated by this invention.

To decrease the overall length of the glove form 10, it is folded in half whereby the hand forming portion 12 and the cuff forming portion 14 are planar and disposed in spaced apart, facing, parallel relationship with each other. During a dipping operation, the hand and cuff forming portions 12 and 14 are oriented vertically. A horizontal bridge portion 22 connects lower edges 24 and 26 of the hand forming portion 12 and cuff forming portion 14, respectively.

As best seen in FIG. 2, the overall thickness of the form 10 is relatively narrow, especially with respect to a glove form modeling a three dimensional representation of the human hand. Because the hand forming portion 12 is folded with respect to the cuff forming portion 14, the overall vertical length of the glove form 10 is significantly reduced. To help control dripping, the bridge portion 22 preferably is not oriented to be truly horizontal but rather slopes laterally by a few degrees. For instance, the bridge 22 slopes slightly downwardly from right to left as viewed from the perspective of FIG. 1.

Figure 3:
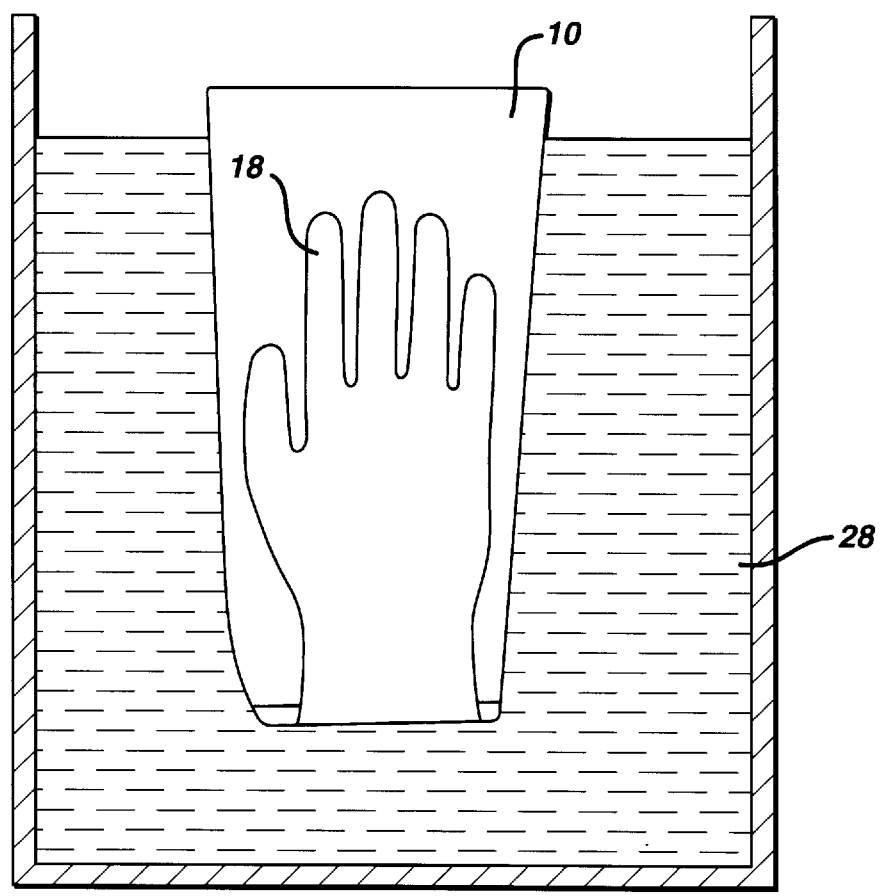
FIG. 3 illustrates the deposition of latex onto the glove form of FIG. 1.
Figure 4:
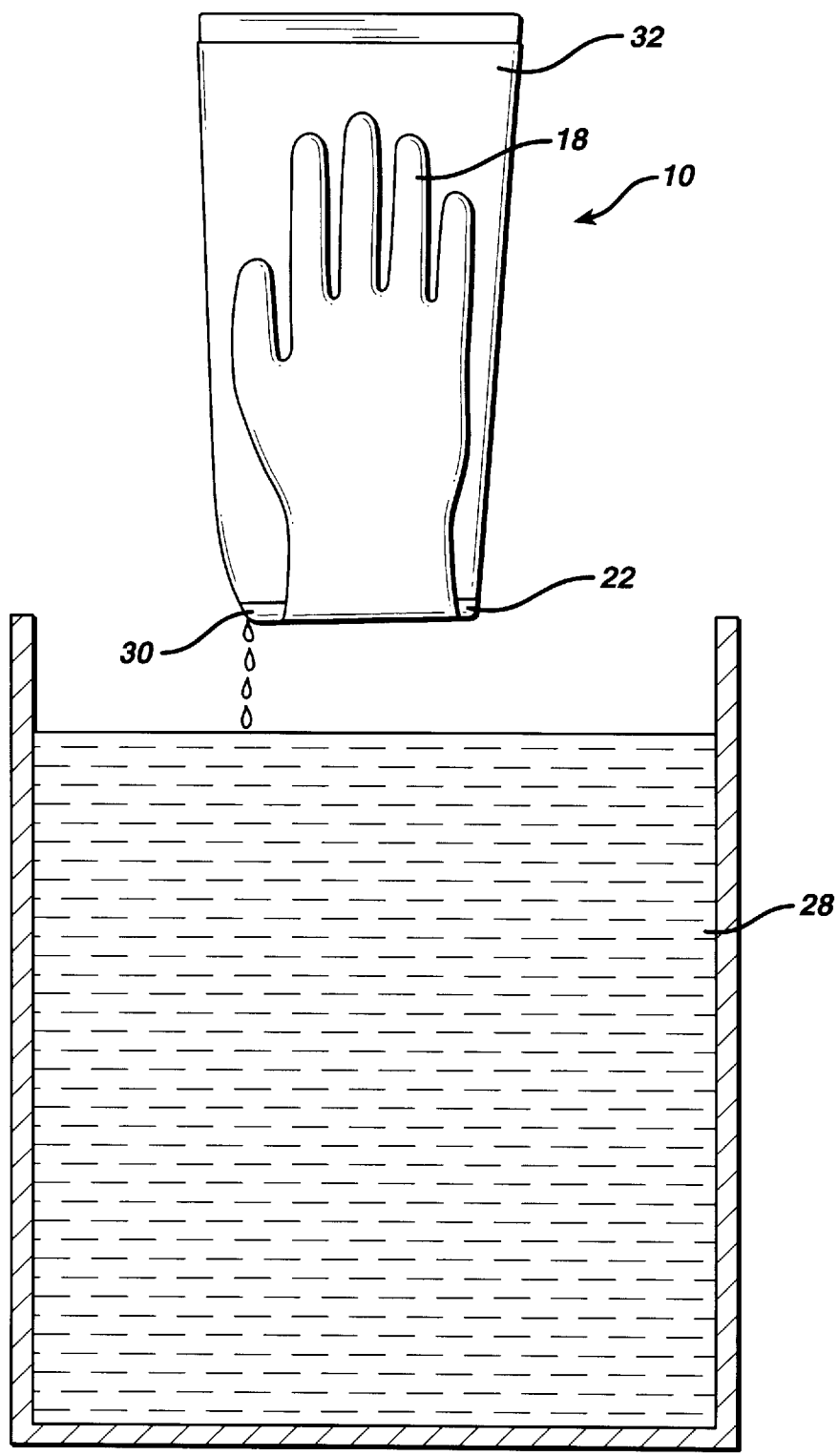
FIG. 4 illustrates the draining of excess latex from the glove form of FIG. 1.

FIGS. 3 and 4 illustrate the glove forming process. As shown in FIG. 3, the glove form 10 is oriented vertically with the finger forming portions 18 pointing upwards. It is dipped vertically into a vat 28 of latex, preferably natural rubber latex. Preferably, the glove form 10 will have been first prepared by dipping in a similar fashion into a vat of coagulant (now shown) as is known in the dipping arts. After a suitable dwell time in the latex bath 28, the glove form 10 is raised vertically.

Excess latex drains off of the form 10 from a low spot 30 on the sloping bridge 22. The finger forming portions 18 are already facing upwardly so there is no need to invert the glove form after dipping. Excess latex drips also away from the tips of the finger forming portions 18.

The latex forms a glove 32 on the glove form 10 which is then subjected to the standard drying, curing, and stripping procedures as are known in the art. Preferably, the glove 32 will be provided with a powder or a powder free type coating as is commonly employed in the art of dipped elastomeric gloves to assist a wearer in donning the glove 32.

The preferred elastomer for forming the glove is natural rubber latex however other suitable elastomers such as nitrile or neoprene may be employed. Preferably, the glove form 10 is made of polypropylene, porcelain or aluminum, with polypropylene being preferred for its ease of construction.

FIGS. 5 and 6 illustrate a further embodiment of a glove form 34 according to the present invention. The glove form 34 comprises a hand forming portion 36, a cuff forming portion 38 and a bridge 40 connecting the hand and cuff forming portions 36 and 38. Each of the hand forming portion 16, cuff forming portion 38 and bridge 40 are planar and lie in a common plane whereby the overall glove form 34 is planar as illustrated in FIG. 6. In other respects, the glove form 34 is essentially similar to the glove form 10 with the exception that it is folded about an alternative axis.

Figure 7:
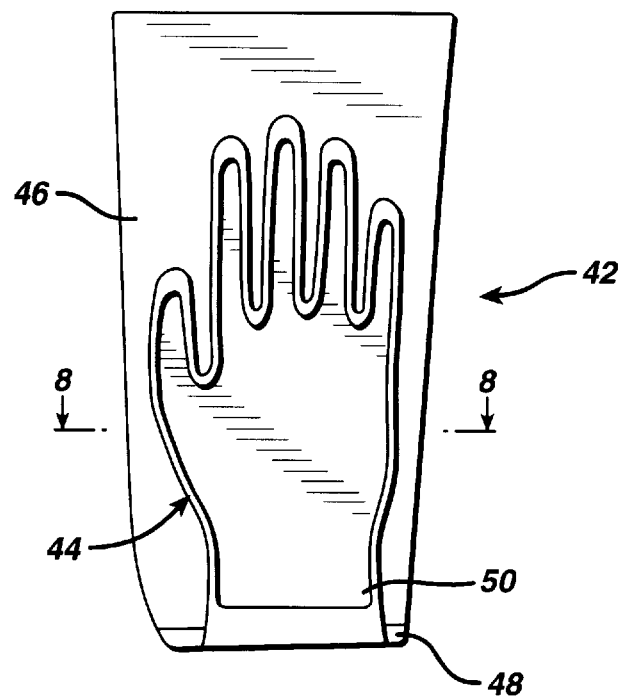
FIG. 7 is a further embodiment of a glove form according to the present invention wherein a recess covers substantially the entire surface of the hand forming and finger forming portions of the form.
Figure 8:
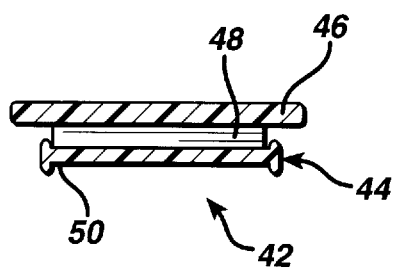
FIG. 8 is a cross-sectional view taken along lines 8—8 of FIG. 7.

As is disclosed in the Stockum '867 patent it is known to provide a recess into the face of a flat glove form to provide additional thickness to the finished glove, reduce stress upon the finished glove and to ease the stripping of the glove from the form. FIGS. 7 and 8 illustrate a further embodiment of a glove form 42 according to the present invention. The glove form 42 comprises a hand forming portion 44, cuff forming portion 46 and bridge 48 and is essentially similar to the glove form 10 of the first embodiment. However, the hand forming portion 44 is provided with a shallow recess 50 over both faces to provide the benefits as described in the Stockum '867 patent.

While the invention has been described with regard to particular embodiments thereof, those skilled in the art will understand, of course, that the invention is not limited thereto since modifications can be made by those skilled in the art, particular in light of the foregoing teachings. Reasonable variation and modification are possible within the foregoing disclosure of the invention without departing from the spirit of the invention. For instance, the invention need not be limited to producing gloves with an extended cuff. A conventional glove form such as that disclosed in the Stockum '867 patent may be folded between the palm and finger sections according to the present invention.

What is claimed is:

1. A method for forming a glove comprising the steps of:
   providing a glove form comprising a hand forming portion, a cuff forming portion, and a bridge connecting the cuff forming portion to the hand forming portion, and wherein the glove form further comprises the glove form folded at said bridge to provide a folded glove form having the cuff forming portion disposed in facing relationship to the hand forming portion;
   the cuff forming portion extending from the bridge to a distal end forming portion for forming a terminal end of a cuff of the glove; and
   the hand forming portion having a palm forming portion connected to the bridge and terminating in finger forming portions, the finger forming portions terminating in distal tips away from the palm forming portion;
   positioning the folded glove form such that the distal end forming portion of the cuff forming portion and the distal tips of the finger forming portions are vertically oriented with respect to a bath of an elastomer to define a vertically oriented configuration, dipping the folded glove form having said vertically oriented configuration into said bath, and adhering a film of the elastomer onto the form;
   removing the folded glove form from the bath; and
   draining excess elastomer from the folded glove form while maintaining said vertically oriented configuration, to inhibit formation of drips of the excess elastomer at the distal tips of the finger forming portions without having to rotate the folded glove form from the vertically oriented configuration.

2. A method according to claim 1 and further comprising the step of orienting the finger forming portions and the palm forming portion in a first plane and orienting the cuff forming portion into a second plane parallel to the first plane, at least during the step of dipping the folded glove form into the elastomer bath.

3. The method according to claim 1 and further comprising the step of providing the cuff forming portion in an extended length which exceeds a combined length of the palm forming portion and the finger forming portions.

4. The method according to claim 1 wherein the step of draining the excess elastomer comprises draining the excess elastomer from a low portion of the folded glove form located between a cuff forming portion outer extent and the finger forming portion distal tips and oriented beneath the cuff forming portion and the finger forming portion distal tips.

5. The method according to claim 4 and further comprising the step of locating the low portion between the palm forming portion and the cuff forming portion.

6. The method according to claim 4 and further comprising the step of shaping and orienting the folded glove form so that the low portion comprises a point.

7. The method according to claim 1 wherein the step of dipping the folded glove form into an elastomer bath comprises dipping the folded glove form into a bath of liquid natural rubber latex.

8. The method according to claim 1 wherein during the step of dipping the folded glove form into the elastomer bath, an upper portion of said distal-end-forming portion does not enter said elastomer bath.

9. A method according to claim 1 wherein said folded glove form includes said hand forming portion in a first plane and oriented in facing relationship with said distal end forming portion of said cuff forming portion in a second plane.

10. A method according to claim 9 wherein said first plane is parallel to said second plane.

11. A method for forming a glove comprising the steps of:
    providing a glove form in a folded configuration comprising a palm forming portion, five finger forming portions connected to said palm forming portion, and a cuff forming portion connected to the palm forming portion, the cuff forming portion terminating in a distal-end-forming portion and the finger forming portions terminating in distal tips away from the palm forming portion and a bridge forming portion;
    wherein said folded configuration comprises the finger forming portions and the palm forming portion folded at said bridge forming portion toward the cuff forming portion with the finger forming portions and the palm forming portion being disposed in a first plane and the cuff forming portion being disposed in a second plane, with said finger forming portions and said palm forming portion oriented in a facing relationship with said distal-end-forming portion;
    positioning the glove form such that the distal-end-forming portion of said cuff forming portion and the distal tips of the finger forming portions are vertically oriented to a bath of an elastomer to define a vertically oriented configuration, dipping the form in its vertically oriented configuration into said bath, and adhering a film of the elastomer onto the form;
    removing the form from the elastomer bath; and
    draining excess elastomer from the form in its vertically oriented configuration to inhibit formation of drips of said excess elastomer at the distal tips of the finger forming portions without having to rotate the form from said vertically oriented configuration.

12. A method according to claim 11 wherein said first plane is parallel to said second plane.

13. A method of forming a glove comprising the steps of:
    providing a bath of liquid elastomer;
    providing a glove form having a wrist forming portion and a hand forming portion, the wrist forming portion extending from a terminal end forming portion to the hand forming portion and the hand forming portion having a palm forming portion and five finger forming portions terminating in distal tips, said finger forming portions extending from the palm forming portion, and the glove form having a folded configuration wherein the terminal end forming portion is above each of the distal tips and each of the distal tips is oriented so that excess/quantities of the liquid elastomer thereon will drain away from the distal tips;
    dipping the form having said folded configuration into the bath of liquid elastomer with the hand forming and wrist forming portions completely submerged in the bath of liquid elastomer;
    removing the form from the bath of liquid elastomer and positioning the form to drain excess quantities of the liquid elastomer from the terminal end and also from each of the distal tips to a low point between the terminal end and the distal tips and allowing the excess quantities of the liquid elastomer to drip off of the form from the low point.

14. A method according to claim 13 wherein the liquid elastomer comprises latex rubber.

15. A method according to claim 13 wherein the low point is below the hand forming portion while draining said excess quantities of the liquid elastomer from the distal tips.

\* \* \* \* \*